March 16, 1943.   J. PATRICK   2,313,963
TOOL
Filed May 11, 1942

INVENTOR
JOSHUA PATRICK
BY LaRue W. Patee
ATTORNEY

Patented Mar. 16, 1943

2,313,963

UNITED STATES PATENT OFFICE 2,313,963

TOOL

Joshua Patrick, Detroit, Mich.

Application May 11, 1942, Serial No. 442,427

2 Claims. (Cl. 82—33)

This invention relates to a live center particularly adapted for use in a tail stock of a lathe or similar machine.

In the manufacture of lathes it is customary to have a live center in the head stock of the lathe and to provide the tail stock with a stationary center upon which the work is pivotally supported. It has been found that it is desirable to have a live center on the tail stock so that the center rotates with the work, thus eliminating wear on the work. A live center, when in use, has two kinds of loads exerted upon its point of contact at the center, radial loads, and thrust loads.

An important object of this invention is to transfer the radial load from the bearings to the shank and to provide a cushion action to protect the bearings from a thrust overload due to the expansion of the work produced by heat during the operation of the device.

Another object of the invention is to provide a tool in which various adapters may be alternately substituted on the tool for receiving different types of work.

A further object of the invention is to provide an adapter which may receive one of a plurality of work receiving tools, and which will be fitted on a live center to provide for an axial thrust without impairing the radial thrust loads on the tool.

Other objects and advantages of the invention will be more fully understood from the following description taken in connection with the accompanying drawing in which.

Figure 1:
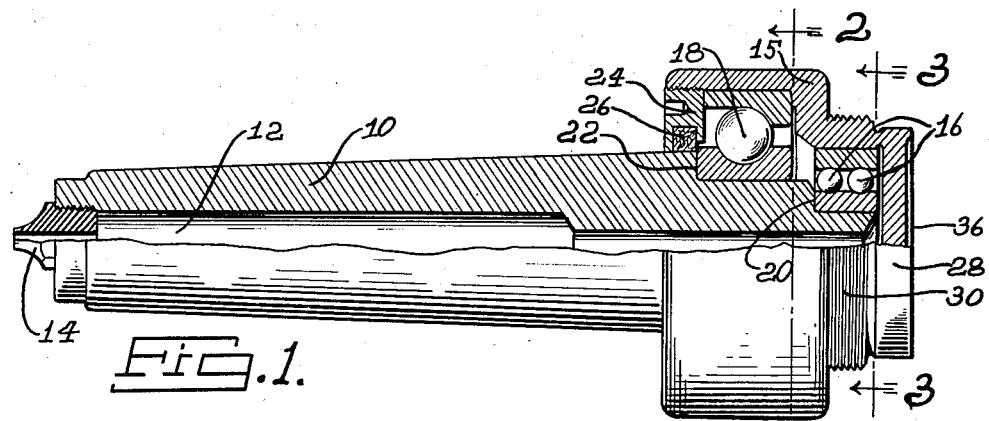
Fig. 1 is a longitudinal view of a preferred embodiment of my invention, the upper half thereof being broken away and shown in cross section.
Figure 2:
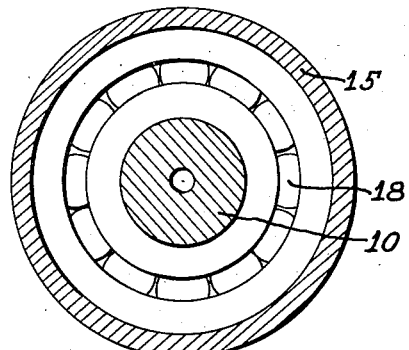
Fig. 2 is a sectional view taken on line 2—2 of Fig. 1.
Figure 3:
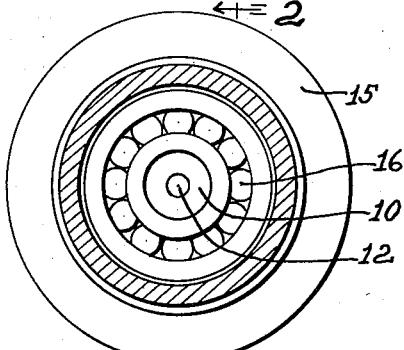
Fig. 3 is a sectional view taken on line 3—3 of Fig. 1.

Referring to the drawing wherein I have illustrated a preferred embodiment of my invention, the reference numeral 10 designates a tapered shank which is adapted to fit into an opening in the tail stock of a lathe. The tapered shank is provided with a bore 12 and the outer end thereof is provided with a screw-threaded opening which receives a fitting 14 for the insertion of lubricant.

The opening 12 extends throughout the longitudinal length of the tapered shank 10 so that lubricant may be supplied from the one end of the tapered shank 10 to the rotatable parts on the opposite end of the shank 10 which will be hereinafter more fully described.

I have provided a closed end sleeve 15 which is rotatably mounted on one end of the tapered shank 10 by radial bearings 16 and a combined radial and thrust bearing 18. The radial bearings 16 are supported against a shoulder 20 and the bearing 18 is supported radially on a large diameter for axial thrust against a shoulder 22. The sleeve 15 is held in its assembled position by a ring 24 which is screw-threaded into an open end of the sleeve 15 with the latter having its inner periphery in engagement with the outer periphery of the tapered shank 10. The ring 24 is also provided with a suitable packing member 26 which maintains the lubricant, supplied through the fitting 14, in the bore 12 which communicates with the bearings 16 and 18.

Figure 4:
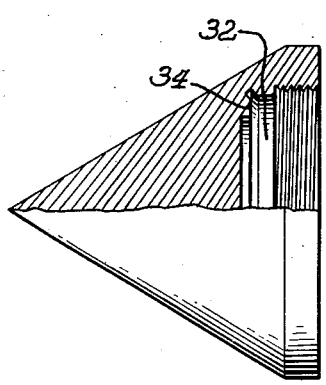
Fig. 4 is a view, partly in section and partly in elevation, showing a work receiving tool to be used on the adapter shown in Fig. 1.
Figure 5:
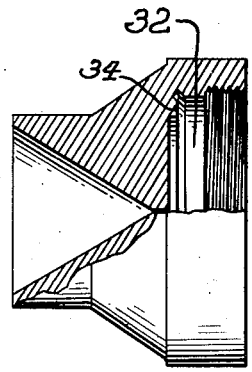
Figs. 5 and 6 are modified forms of work receiving tools respectively, of the adapter shown in Fig. 1.
Figure 6:
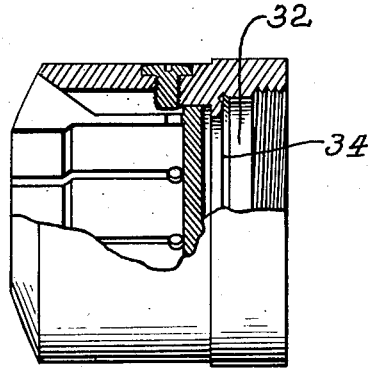

The sleeve 15 is provided at its outer end with an accurately machined peripherial surface 28, and a large, screw-threaded periphery 30 which is adapted to receive suitable fittings to accommodate different types of work, some of which are illustrated in Figs. 4, 5, and 6.

In Fig. 4 I have illustrated a male fitting which is particularly adapted for use with tubing or hollow objects of varying diameter.

In Fig. 5 I have illustrated a female fitting to receive work of varying diameter, and in Fig. 6 I have shown a collet fitting designed to clamp the work to prevent relative rotation thereof. It will be understood that the collet may be made of any radial dimension to accommodate the work which is to be received.

Each of the fittings, shown in Figs. 4, 5 and 6, are provided with peripherial surfaces 32 which accurately fit the surface 28 of the sleeve 15. This is to provide for radial thrust and to accurately locate the fitting at the center of the tool. There is also provided a shoulder 34 which engages a shoulder 36 of the sleeve 15 to take the axial thrust of the fitting. In order to assure proper engagement of the surface 28 with the surface 32 and the shoulder 34 against the shoulder 36, I have provided an angularly extending recess at the intersection of the surfaces 32 and 34.

It will be understood that by the provision of a tool, such as above described, adapted to receive fittings of the type disclosed, I have provided a tool which may be used for various types of work without removal of the tapered shank from the tail stock of the machine in which the tool is used.

Various changes including the size, shape, and arrangement of parts may be made without departing from the spirit of the invention, and it is my intention to cover by my claims such changes as may be reasonably included within the scope thereof.

What I claim is:

1. A live center for use in a tail stock of a lathe comprising, a tapered shank portion, a bearing receiving portion at the larger end of said tapered shank portion, a pair of bearings each having inner and outer races on said bearing receiving portion, the outer diameter of one bearing being larger than the other of said bearings, a sleeve having a closed end journaled on said bearings; said sleeve having a tubular portion to fit the larger of said bearings, a reduced diameter portion to fit the smaller of said bearings and having a screw-threaded outer periphery, and a further reduced diameter closed end portion having a smooth finished outer periphery to receive one of a variety of work adapters; and a screw-threaded end wall received in the open end of said sleeve and bearing against the side of the outer race for said larger bearing.

2. A live center for use in a tail stock of a lathe comprising, a tapered shank portion, a bearing receiving portion at the larger end of said tapered shank portion, a pair of bearings each having inner and outer races on said bearing receiving portion, the outer diameter of one of said bearings being larger than the other of said bearings, a sleeve having a closed end journaled on said bearings; said sleeve having a tubular portion to fit the larger of said bearings, a reduced diameter portion to fit the smaller of said bearings and having a screw-threaded outer periphery, and a further reduced diameter closed end portion having a smooth finished outer periphery; a work adapter having one end provided with internal screw-threads to be received on the screw-threads of said sleeve, a reduced diameter face in the adapter to be received on the outer periphery of said closed end portion, an end wall adjacent to said last named face, and a groove having a diameter greater than the reduced diameter face of said adapter at the intersection of said face and said end wall.

JOSHUA PATRICK.